Inventor
C. G. TREADWELL
By [signature]
Attorney

Inventor
C. G. TREADWELL
By [signature]
Attorney

Inventor
C. G. TREADWELL
By [signature]
Attorney

Inventor
C. G. TREADWELL
By [signature]
Attorney

Nov. 15, 1960 C. G. TREADWELL 2,960,574

ELECTRIC PULSE CODE MODULATION SYSTEMS

Filed June 6, 1955 9 Sheets-Sheet 5

Inventor
C. G. TREADWELL
By [signature]
Attorney

Inventor
C. G. TREADWELL
By [signature]
Attorney

Inventor
C. G. TREADWELL
By [signature]
Attorney

Inventor
C. G. TREADWELL
By [signature]
Attorney

Nov. 15, 1960 C. G. TREADWELL 2,960,574

ELECTRIC PULSE CODE MODULATION SYSTEMS

Filed June 6, 1955 9 Sheets-Sheet 9

Inventor
C. G. TREADWELL
By [signature]
Attorney 2,960,574

ELECTRIC PULSE CODE MODULATION SYSTEMS

Cyril Gordon Treadwell, London, England, assignor to International Standard Electric Corporation, New York, N.Y., a corporation of Delaware Filed June 6, 1955, Ser. No. 513,404

Claims priority, application Great Britain July 12, 1954

8 Claims. (Cl. 179—15.6)

The present invention relates to electric pulse code modulation systems, and is concerned principally with the coding and decoding arrangements in such systems.

In order to reduce the effect of the quantising error in code modulation systems it is the usual practice to apply amplitude compression at the transmitting end and corresponding amplitude expansion at the receiving end in order that the quantising error may be made smaller for signals of small amplitude. For this purpose it has hitherto been usual to employ arrangements involving non-linear circuit elements such as rectifiers, or valves operated over a curved part of the characteristic. The difficulty with these arrangements has always been to provide sufficiently accurate and stable matching between the characteristics of the expander and compressor on account of the variability of the characteristics of the non-linear elements which are used.

In this specification, the term "non-linear circuit element" means an element providing a parameter (such as an impedance or an attenuation or a gain, for example), which varies with the current or voltage applied to the element.

The principal object of the invention is to overcome the practical difficulties associated with compression and expansion in code modulation systems, and this object is achieved according to the invention by providing a coding arrangement for an electric pulse code modulation system of communication in which samples of one or more signal waves are each translated into a corresponding group of digit pulses representing the sample according to a specified pulse code, and in which compression of the sample amplitude is effected as part of the process of translation of the sample into the digit pulse group.

The invention will be described with reference to the accompanying drawings, in which.

Figure 1:
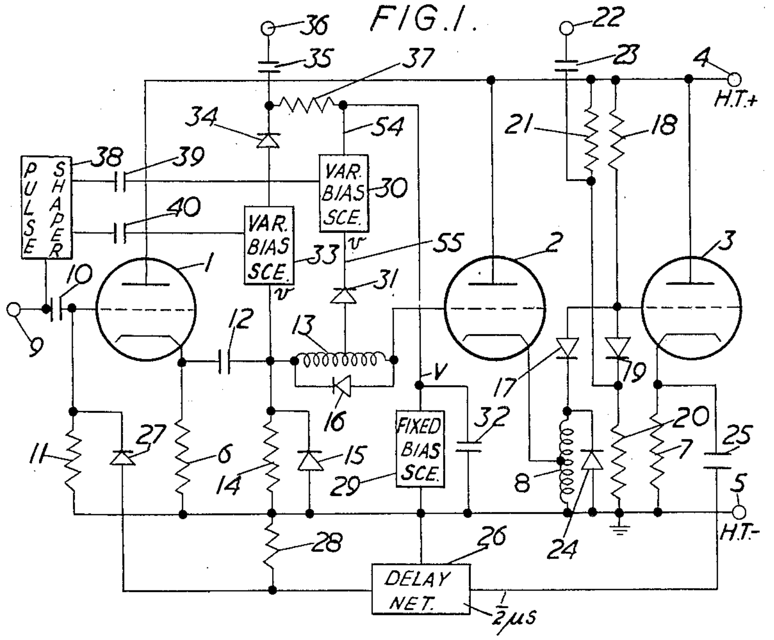
Fig. 1 shows a schematic circuit diagram of a coding arrangement according to the invention, including amplitude compressing means not involving any non-linear circuit element.

The system which will be employed to illustrate the invention is one in which the cyclic permutation code is used, and the signal wave to be coded will be symmetrical about the zero axis so that an equal range of positive and negative amplitude values have to be represented. Assuming that a binary pulse code with N+ 1 digits is employed, the first digit will be used to indicate whether the amplitude sample is positive or negative, and the remaining N digits will indicate the magnitude of the amplitude level according to the cyclic permutation code irrespective of whether it is positive or negative.

The sampling arrangement employed is one in which the instantaneous amplitude of each signal wave is represented by a short sample pulse whose amplitude is proportional to the instantaneous amplitude, but which is always positive whether the amplitude is positive or negative. An inspection is made to determine whether the sample pulse corresponds to a positive or a negative amplitude, and an initial digit pulse is transmitted in the first case only. The positive sample pulse is then coded and represented by the N digit pulses which follow the initial digit pulse according to the cyclic permutation code.

It should be pointed out that the initial digit pulse is treated separately from the other digit pulses of the code, since the N+1 digit pulses of each code group (that is including the initial digit pulse) do not form a group according to a cyclic permutation code of N+1 digits.

The preferred arrangement for determining whether a sample pulse corresponds to a positive or a negative instantaneous signal wave amplitude is one in which a positive sample pulse is produced on one of two conductors according as the instantaneous amplitude is positive or negative. Then the sample pulse gives rise to an initial digit pulse only if it occurs on the conductor corresponding to a positive instantaneous amplitude.

Compression is applied to each sample pulse as part of the coding process, and this compression is obtained according to the invention by effectively subtracting from the amplitude of the sample pulse a proportion which is a function of the amplitude before compression. The functional relation is preferably obtained by means of a network not containing any non-linear circuit element, and the compression characteristic is determined by the form of the function.

In order to explain this feature in more detail, one form of a pulse coder for producing the cyclic permutation code, including compression arrangements according to the invention will be described with reference to Fig. 1. This coder is of the type having a coding loop circuit including a voltage doubling device and a delay network by means of which the successive digit pulses are produced by a circulating process.

The coder circuit comprises three valves 1, 2, 3, all of which are arranged as cathode follower amplifiers with large negative feedback, so that the voltage gain ratio is in each case substantially equal to 1. The anodes are connected directly to the positive terminal 4 for the high tension source (not shown), the corresponding negative terminal 5 being connected to ground. The cathodes of the valves 1 and 3 are connected to ground through resistors 6 and 7, and the cathode of the valve 2 is connected to ground through the lower part of the winding of a closely coupled autotransformer 8, the function of which will be explained later.

A train of short positive amplitude-modulated pulses representing samples of the signal waves of one or more channels is applied to an input terminal 9 connected to the control grid of the valve 1 through a blocking capacitor 10. The duration of these sample pulses will be assumed to be ½ microsecond. A ground leak resistor 11 is provided for the control grid of the valve 1.

The sample pulses with their amplitude substantially unaltered are supplied from the cathode of the valve 1 through a blocking capacitor 12 and a closely coupled, centre-tapped, autotransformer winding 13 to the control grid of the valve 2. The junction point of elements 12 and 13 is connected to ground through a resistor 14 shunted by a rectifier 15 directed in such manner as to prevent the potential of the upper end of resistor 14 from becoming negative. A rectifier 16 shunts the autotransformer winding 13, and is directed to prevent the left hand terminal of the winding from becoming negative to the right hand terminal, for damping out any oscillations which may be produced.

The upper end of the autotransformer winding 8 is connected to the control grid of the valve 3 through a rectifier 17. This control grid is also connected to terminal 4 through a resistor 18, and to ground through a rectifier 10 and a resistor 20. The junction point of elements 19 and 20 is connected to terminal 4 through a resistor 21, and to an input terminal 22 through a capacitor 23. The rectifiers 17 and 19 are directed so that they will both normally be unblocked. A negative blocking pulse is applied to terminal 22 for terminating the operation of the coder when the generation of each pulse code group has been completed. The autotransformer winding 8 is shunted by a rectifier 24 directed in such manner as to prevent the potential of the upper terminal from becoming negative.

The cathode of the valve 3 is connected through a blocking capacitor 25, a delay network 26, and a rectifier 27, to the control grid of the valve 1, thereby completing the coding loop circuit. The rectifier 27 is directed to pass positive pulses to the valve 1. A terminating resistor 28 is provided for the delay network 26. This delay network produces a delay of ½ microsecond.

The centre tap of the autotransformer winding 13 is connected to two bias sources 29 and 30 through a rectifier 31. The source 29 has one terminal connected to ground, and supplies at the other terminal a fixed and stabilised bias voltage V. The source 30 is connected in series with the source 29 and supplies a variable bias voltage $v$. The bias potential applied to the rectifier 31 with reference to ground potential is thus $V+v$. The two voltages V and $v$ may be of either sign with the requirement that $V+v$ is always positive. The rectifier 31 is directed so that it will be blocked until the potential of the centre tap of the winding 13 exceeds $V+v$. The source 29 is shunted by a by-pass capacitor 32.

A third bias source 33 exactly similar to source 30 has one terminal connected to the junction point of elements 12 and 13, and the other terminal through a rectifier 34 and a blocking capacitor 35 to an output terminal 36 from which the code groups of pulses are obtained.

The upper end of the rectifier 34 is also connected through a resistor 37 to the source 29, and this rectifier is directed similarly to rectifier 31. The source 33 provides a variable bias voltage $v$ which is always of the same magnitude and sign as the variable bias voltage produced by the source 30. It will be seen therefore, that the rectifier 34 will be blocked until the potential of the junction point of elements 12 and 13 exceeds $V+v$.

The two variable voltage sources 30 and 33 are controlled or modulated by each sample pulse applied at terminal 9 in such manner that the bias voltage $v$ which each produces is a function of the amplitude of the pulse. For this purpose the sample pulses are applied to a pulse shaper 38 which lengthens each pulse so that its duration is increased from ½ microsecond to a period a little greater than the period occupied by a complete code group of pulses. For example, the lengthened pulses may have a duration of 2½ microseconds. The lengthened pulses are applied to the bias sources 30 and 33 through respective blocking capacitors 39 and 40, and control the value of the bias voltage $v$ produced by each of them. It will be noted that $v$ remains constant while the code group corresponding to any sample pulse is being generated, but will in general have a different value for different sample pulses.

In order to explain the operation of the coder, it will be assumed that a four digit code will be used to represent the sample pulses applied to terminal 9. In the case where the coder is used for coding both positive and negative instantaneous signal amplitudes, the initial digit pulse, the presence of which indicates that the sample pulse represents a positive instantaneous amplitude, is additional to the four digit pulses and is produced at an earlier stage not shown in Fig. 1, and this will be explained later on. The coder of Fig. 1 produces an N-digit cyclic permutation code, where, for the particular example to be described, $N=4$.

Figure 2:
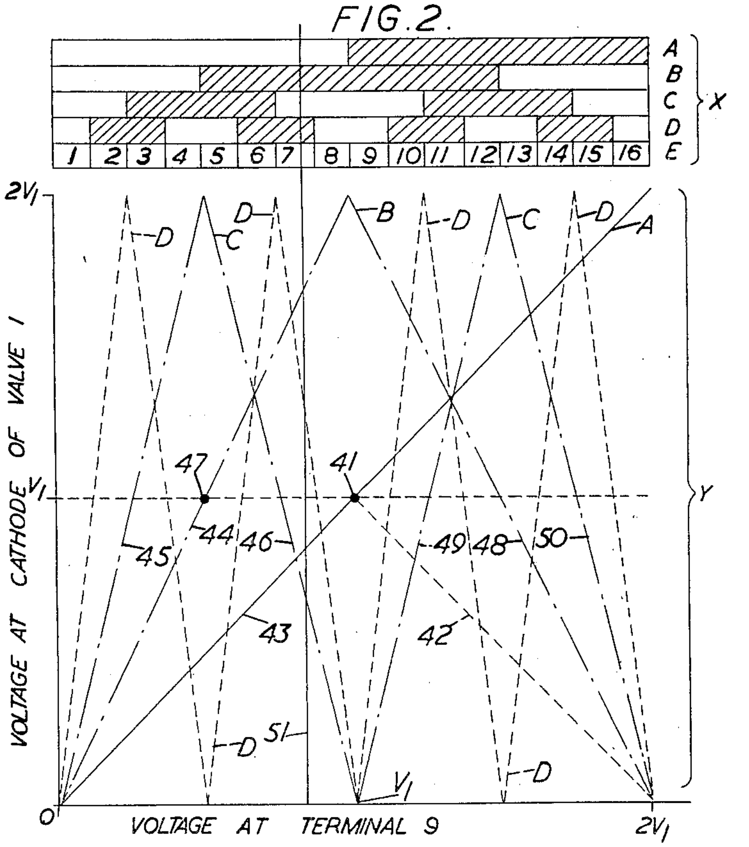
Fig. 2 shows graphical diagrams used to explain the operation of Fig. 1.

In Fig. 2 at X is shown a diagram of the four-digit cyclic permutation code. The horizontal scale represents the voltage amplitude of the sample pulse to be coded, referred to a zero at the left hand side. The shaded areas in the sections corresponding to the respective code digits 1 to 4 (designated A, B, C and D respectively) indicate that a code pulse is present in any digit position when the sample pulse amplitude corresponds to one of these shaded areas, but not otherwise. The fifth section of this diagram (designated E) shows the 16 quantized amplitude steps represented by the four digit code.

In order that the operation of the coder may be clearly understood, it will first be assumed that no compression is applied. The pulse shaper 38 (Fig. 1) will be supposed disconnected from terminal 9, and it will be assumed that the bias voltage $V+v$ applied to rectifiers 31 and 34 is adjusted to a fixed value $V_1$, where $2V_1$ is the maximum voltage amplitude of the sample pulses applied to terminal 9.

The abscissae of the graphs shown at Y in Fig. 2 represent the sample pulse voltage applied to terminal 9 of Fig. 1, and the ordinates represent the corresponding voltage at the cathode of the valve 1. Four straightline graphs are shown labelled A, B, C and D. Graph A represents the relation between the voltage of the cathode of the valve 1 and the amplitude of the pulse applied to terminal 9. Since it has been assumed that the voltage gain ratio of the valve 1 is equal to 1, the graph A is a straight line through the origin inclined at 45° to the axes. It follows also that the horizontal voltage scale for the code diagram at the top of Fig. 2 is the same as the scale of abscissae of the graphs.

Graph B shows the relation between the voltages which appears at the cathode of the valve 1 after one transit round the coding loop through the valves 2, 3 and delay network 26, and the amplitude of the input pulse applied at terminal 9 in response to which the said voltages is produced. This curve is obtained in the following way. If it be supposed that the amplitude of the pulse applied to terminal 9 increases progressively from zero, the voltage applied to the control grid of the valve 2 will follow this increase, according to graph A, until this voltage reaches the value $V_1$, the bias applied to the rectifier 31. At this point the rectifier 31 conducts and holds the potential of the centre tap of the autotransformer 13 fixed at the value $V_1$. This occurs at the point 41 where the graph A cuts the dotted bias line drawn at the level $V_1$ in Fig. 2. Thereafter, as the input pulse voltage increases above $V_1$ by a given amount, the potentials of the right-hand end of the autotransformer winding 13 connected to the valve 2 must decrease below $V_1$ by the same amount, on account of the transformer action which now takes place between the two halves of the winding, which should be closely coupled.

The potential applied to the control grid of the valve 2 therefore now decreases from $V_1$ to zero, as the pulse amplitude increases from $V_1$ to $2V_1$, as indicated by the dotted line 42 in Fig. 2.

The cathode of the valve 2 is connected to the centre point of the winding of the autotransformer 8, the two halves of which should be closely coupled, so that a step-up voltage ratio of 2 will be obtained. The voltage applied to the control grid of the valve 3 will therefore always be double that applied to the control grid of the valve 2; and so also will be the voltage which appears at the cathode of the valve 1 after ½ microsecond delay in the delay network 26. Thus the variation of the voltage at the cathode of valve 1 will be as shown in graph B, the ordinates of which are double those of the first part 43 of graph A up to the point 41, and the dotted line 42.

It has been assumed in this explanation that the gain ratio of each of the three valves is equal to 1, and that there is no attenuation in the delay network 26. In practice, none of these assumptions are exactly true, but accurate doubling of the voltage after passage once round the coding loop can be obtained by a small adjustment of the tapping point in the autotransformer 8 so that a voltage step-up ratio slightly greater than 2 is obtained.

It will now be clear from the explanation which has been given of the relation between the graphs A and B that during the second transit round the coding loop, the portion 44 of the graphs B will give rise to a voltage at the cathode of the valve 1 represented by the two lines 45, 46 of graph C, the apex occurring at the abscissa corresponding to the point 47 where the line 44 crosses the bias line $V_1$. The line 48 of graph B will evidently give rise to another similar pair of lines 49, 50 of graph C.

During the third transit round the loop, it will be evident that each of the four lines 45, 46, 49 and 50 will give rise to a corresponding pair of lines of graph D, which therefore has four apices on the same ordinates as the points where the lines 45, 46, 49 and 50 cut the bias line $V_1$. The same process would continue in like manner indefinitely, each successive graph having double the number of apices as the preceding graph, but since in the present case only a four-digit code is required, a negative blocking pulse is supplied to terminal 22 (Fig. 1), by means not shown, to block the rectifier 17 through the rectifier 19 just after the third cycle has been completed, thus stopping any further operation. Thus the elements 18, 19 and 20 should be chosen so that initially a positive bias slightly greater than $2V_1$ is applied to the rectifier 17.

Since the bias applied to the rectifier 34 is $V_1$, it will be seen that a digit pulse can only be supplied to the output terminal 36 if the potential of the cathode of the valve 1 is equal to or greater than $V_1$. By reference to the graphs of Fig. 2Y, it will be seen that this will happen when the abscissa of the input sample pulse amplitude corresponds to a portion of one of the graphs A, B, C, D, which is on or above the bias line $V_1$. It will be noted by comparing the code diagram of Fig. 2X with these curves that the portions of these graphs on or above the bias line $V_1$ correspond respectively with the shaded portions of the code diagram.

As a particular example, an ordinate 51 has been drawn across the graphs representing a sample pulse amplitude of about $0.8\ V_1$ lying in step 7 of the quantising scale E, Fig. 2X. This cuts shaded areas of the code diagram corresponding to the second and fourth digits (labelled B and D), indicating pulses in these digit positions, but not in the first and third positions. The ordinate 51 cuts graphs B and D, Fig. 2Y, above the bias line $V_1$, showing that digit pulses will be generated by the circuit of Fig. 1 in the corresponding digit positions. The ordinate 51, however, cuts the graphs A and C below the bias line $V_1$, showing that no digit pulses will be generated in the corresponding digit positions.

It should be pointed out that the digit pulses obtained from terminal 36 in Fig. 1 will generally be of variable amplitude, and it is desirable that suitable means (not shown) should be provided for adjusting their amplitudes to the same value. For example, they may be applied to operate a conventional trigger circuit which generates a short pulse of given amplitude in response to each digit pulse.

In the explanation of the coder given so far, it has been assumed that no compression is applied, and the maximum voltage amplitude of a signal pulse which can be dealt with is $2V_1$. In order to apply compression by one method according to the invention, the bias voltage $V_1$ is varied as a function of the voltage amplitude $e$ of each sample pulse to be coded, and increases with $e$. A different method of producing the same result will be described later on.

It will now be assumed that in Fig. 1, the pulse shaper 38 is reconnected to control the bias sources 30 and 33, so that the total bias voltage $V+v$ (which corresponds to $V_1$) varies with $e$. The variable $v_1$ will be used to denote the variable bias voltage $V+v$, and its maximum value will be taken as $V_1$.

A suitable functional relation between the sample pulse amplitude $e$ and the bias voltage $v_1$ is obtained by putting $v=Re$, where R is a numerical constant, so $$v_1=V+Re \qquad (1)$$

By appropriately choosing V and R, a satisfactory compression characteristic may be obtained. Having chosen the functional relation between $v_1$ and $e$, it is necessary to determine the relation connecting $e$ and $v_1$ with the quantising steps. In the present case of a four-digit code, reference to the code diagram in Fig. 2 shows that when the sample pulse voltage $e$ just corresponds to one whole quantising step, a code pulse in digit position 4 (strip D, Fig. 2) only is required, and this code pulse will be produced when $e$ equals $v_1$ after having been doubled three times (that is, N−1 times, where N=4). When $e$ just corresponds to the first two quantising steps, it will equal $v_1$ after having been doubled twice, and produces a digit pulse in the third digit position. After being doubled a third time it equals $2v_1$ and a digit pulse is also produced in the fourth digit position as required by the code. For the first and second quantising steps, therefore, it follows that $e=1\times v_1/8$ and $e=2\times v_1/8$, respectively. By considering each quantising step in turn in a similar way with reference to the code diagram it can be shown that $e=n.v_1/8$, where $n$ is the number of the quantising step and has values from 1 to 16 for a four digit code. In order to draw attention to a further point, the special cases of $n=8$ and $n=16$ will also be mentioned. When $n=8$, $e=v_1$ and a code pulse will just be produced in the first digit position. After doubling once, $e$ becomes $2v_1$, and a pulse will be produced in the second digit position, as required. But owing to the characteristic of the coder (Fig. 1), the potential applied to the control grid of the valve 2 is now zero, and no more code pulses can be produced. Likewise, when $n=16$, $e=2v_1$, and a code pulse is produced in the first digit position, as required, but the potential applied to the control grid of the valve 2 is zero and no more code pulses can be produced.

Thus the required relation between $e$, $v_{1(N-1)}$, and the quantising step number $n$ is:

$$e=n.v_1/8=n.v_1/2 \qquad (2)$$

generally, for an N-digit code.

By eliminating $v_1$ from the Equations 1 and 2 it follows that $$e=nV/(2^{(N-1)}-nR) \qquad (3)$$

It will be noted that the relation between $e$ and $n$ is hyperbolic, and that e becomes indefinite when $nR=2(N-1)$. Thus, by suitably choosing R, the amount of compression for the higher values of $e$ in relation to the lower values can be selected as desired. Having chosen R, the choice of V determines the maximum value of $e$, that is, it decides the scale of the arrangement.

Figure 3:
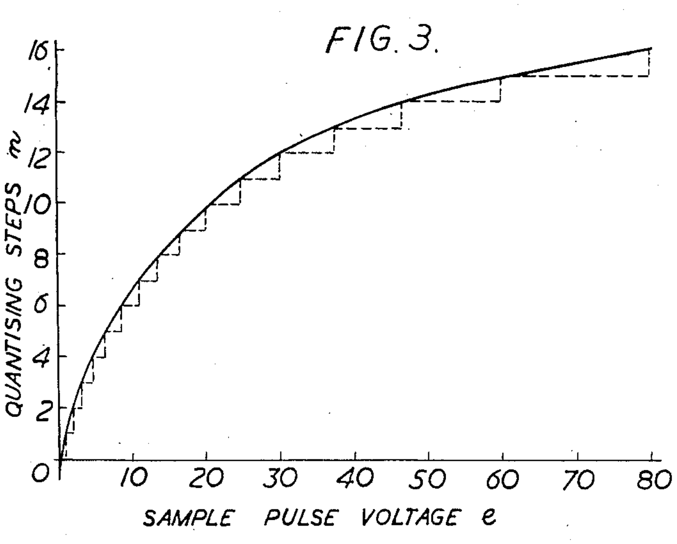
Fig. 3 shows an amplitude compression characteristic obtained with the circuit of Fig. 1.

A convenient pair of values for V and R are 8 volts, and 0.4 respectively. Then assuming N=4, we have $$e=20n/(20-n) \text{ volts} \quad (4)$$

where $n$ has any integral value up to 16. Fig. 3 shows a graph of Equation 4. The maximum value of $e$ is 80 volts, and the degree of compression is indicated by the fact that the first quantising step is slightly over 1 volt while the last one is 20 volts.

While the fundamental functional relation between $v_1$ and $e$ represented by Equation 1 is not the only one which could have been chosen, it has the advantage that it can be realised extremely simply by means of a potentiometer, and since it is a linear relation, no non-linear circuit elements are required to produce it.

Figures 4, 6:
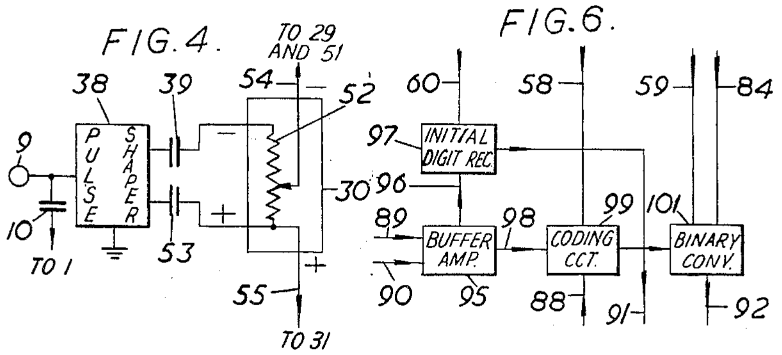
Fig. 4 shows details of one of the elements of Fig. 1.
Fig. 6 shows a block schematic circuit diagram of one of the elements of Fig. 5.

To realise Equation 1, the source 29 will be designed to produce a fixed stabilized positive voltage V (8 volts for example), and the devices 30 and 33 each supply a variable positive bias voltage $v$=R$e$ derived from the lengthened sample pulses from the pulse shaper 38. Fig. 4 shows the arrangement. The bias source 30 comprises a potentiometer 52 connected across the output of the pulse shaper 38 through blocking capacitors 39 and 53, in such manner that when a positive sample pulse of voltage $e$ is applied to terminal 9, the lower end of the potentiometer is positive to the upper end. The movable contact of the potentiometer 52 is connected over conductor 54 to elements 29 and 37 of Fig. 1 and the lower end is connected to element 31 over conductor 55. The potentiometer 31 is adjusted until the difference of potential of the conductors 54 and 55 is equal to R$e$. The bias source 33 (Fig. 1) is arranged and adjusted in exactly the same way.

It should be noted that in Fig. 1 there is no point from which it is possible to obtain directly a pulse whose amplitude is proportional to the compressed amplitude of the corresponding sample pulse applied at terminal 9. The only way to obtain such a pulse would be to decode the corresponding group of digit pulses delivered to terminal 36. Thus it will be clear that compression is effected as part of the coding process and cannot be separated from it.

Although in Fig. 1 a variable bias voltage $v_1$ is used to control the production of the code group, it is also possible, according to a variation of the invention, to use a fixed bias voltage and to transfer the variable portion to the sample pulse amplitude. In this case, the variable portion $v$, which is equal to R$e$ from Equation 1, is subtracted from the sample pulse amplitude, instead of being added to the bias voltage produced by the source 29. This produces exactly the same results.

An arrangement of this kind will be described in connection with a complete multichannel pulse code modulation system which will be described with reference to Figs. 5 to 14.

Figure 5:
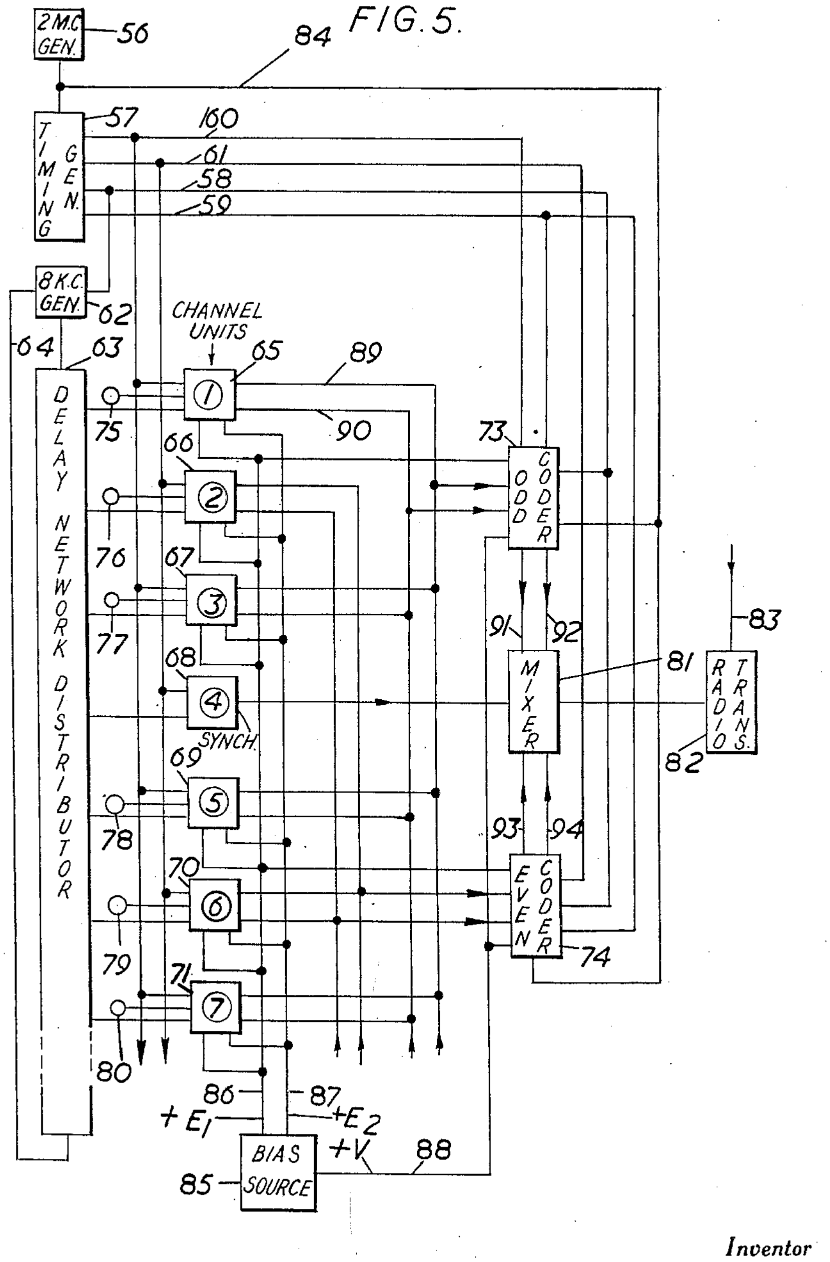
Fig. 5 shows a block schematic circuit diagram of a transmitter for a multichannel pulse code modulation system employing coding arrangements according to the invention.

Fig. 5 shows a block schematic circuit diagram of the transmitter of such a multichannel system. The distribution of the various channels is carried out by conventional means, which it will not be necessary to describe in detail. The timing of the system is controlled by a master pulse generator 56 which generates short pulses at a frequency of 2 megacycles per second. This generator should preferably be crystal controlled. The pulses from the generator 56 are supplied to a frequency dividing pulse generator 57 which produces four series of positive timing pulses with a repetition frequency of 200 kilocycles per second. The first series of timing pulses are supplied to a conductor 58, and consist of rectangular pulses of duration 2½ microseconds. These pulses are shown in graph A, Fig. 9. The second series of timing pulses (shown in graph B, Fig. 9) are supplied to a conductor 59, and these pulses also have a duration of 2½ microseconds, but are generated during the intervals between the pulses of the first series. The third series of timing pulses (shown in graph C, Fig. 9) are supplied to a conductor 60, and consists of short timing pulses with a duration of ½ microsecond and coinciding subsequently with the leading edges of the pulses of the first series supplied to conductor 58. The fourth series of timing pulses (shown in graph D, Fig. 9) are similar to the third series except that they coincide substantially with the leading edges of the second series of pulses.

The various channels of the system are divided into two groups containing respectively the odd-numbered and even-numbered channels. The timing of the odd-numbered channels is controlled by the C pulses supplied to the conductor 60, and the timing of the even-numbered channels is controlled by the D pulses supplied to the conductor 61. The A pulses are supplied from conductor 58 to a frequency dividing pulse generator 62 arranged to produce a train of rectangular gating pulses at a frequency of 8 kilocycles per second, for example. These gating pulses should have a duration of about 3 microseconds, and are supplied to a delay network distributor 63 by means of which the respective channels are put in operation in turn.

According to the usual practice, a conductor 64 connects the output of the delay network 63 to the generator 62 for stabilising the frequency of this generator.

By adopting the above-suggested values, the system can accommodate 50 channels, and a period of 2½ microseconds will be available for transmitting the code group representing each sample of each channel signal wave.

For each channel, there is provided a separate channel unit, of which only 7 are shown. It will be understood that as many of these channel units as may be necessary will be provided. The odd-numbered channel units 65, 67, 69 and 71, are connected to a coder 73, and the even-numbered channel units 66 and 70 are connected to a second exactly similar coder 74. The unit 68 which corresponds to one of the even-numbered channels is a synchronising pulse generator of conventional type which generates a train of synchronising pulses or signals which are distinguishable from the code pulses. Each synchronising pulse may, for example, be a rectangular pulse of duration 2 microseconds.

It will be noted that the elements 65 to 71, inclusive, are connected to successive tapping points on the delay network 63, which are spaced apart at intervals corresponding to 2½ microseconds, and that the odd numbered elements 65, 67, 69 and 71 are connected to the conductor 60, which provides the C timing pulses, and that the elements 66, 68 and 70 are connected to conductor 61 which supplies the D timing pulses. Terminals 75 to 80, inclusive, are provided as input termnials for the channel units, to which terminals the respective signal waves to be coded are connected.

The outputs of the coders 73 and 74 which deal respectively with the odd-numbered and even-numbered channels, are connected to a mixer circuit 81, the output of which is connected to a radio transmitter 82 which radiates the code pulses from an antenna 83. The synchronising pulses from the generator 68 are supplied directly to the mixer circuit 81.

For controlling the operation of the coder 73, A, B and C timing pulses are supplied to it over conductors 58, 59 and 60, and also the short pulses from the generator 56 over conductor 84. Likewise, for controlling the coder 74, the A, B and D timing pulses are supplied over conductors 58, 59 and 61 and also the pulses from conductor 84.

A stabilised source 85 of bias potentials is supplied for the whole system. This source supplies to each of the channel units over conductors 86 and 87 two bias voltages having the fixed values $E_1$ and $E_2$. Source 85 also supplies the bias voltage V to each of the coders 73 and 74 over conductor 88.

Full details of the channel units and of the coders 73 and 74 will be given later on. However, the following preliminary points will be mentioned.

Each of the channel units is designed to produce a train of amplitude modulated sample pulses of ½ microsecond duration from the corresponding applied signal wave. All the sample pulses are, however, positive, but those corresponding respectively to positive and negative instantaneous signal amplitudes are delivered respectively to two separate output conductors designated 89 and 90 at the output of the channel unit 65. The channel units are so designed that the potential of each of the conductors 89 and 90 is always zero when the amplitude of the applied signal wave is zero. In the coder 73, an inspection is made to determine on which of the two conductors 89 and 90 the sample pulse is present, and assuming that the conductor 89 corresponds the positive signal amplitudes, the coder produces directly on an output conductor 91 an initial digit pulse only if the sample pulse is present on conductor 89. If the sample pulse is present on conductor 90 no initial digit pulse is supplied to conductor 91. The coder then proceeds to generate a four-digit cyclic permutation code in response to the sample pulse whether it occurs on conductor 89 or on conductor 90. After the four-digit code has been produced in this way, it is then converted in the coder to the ordinary binary code by conventional means and this binary code is separately supplied to the mixer 81 over conductor 92.

The coder 74 operates in exactly the same way as the coder 73 for the even-numbered channels, and supplies the initial digit pulse, and the four-digit code group, separately over conductors 93 and 94 to the mixer 81. Thus it will be seen that the synchronising pulses from the generator 68, and the complete five-digit code groups from the coders 73 and 74 are all combined together by the mixer 81 and are supplied to the radio transmitter 82.

Fig. 6 shows a block schematic circuit diagram of the coder 73. The coder 74 will be similar. In Fig. 6 the conductors 89 and 90 from the channel unit 65 are connected to a buffer amplifier 95 which determines whether the sample pulse to be coded appears on conductor 89 or on conductor 90. If the sample pulse appears on conductor 90, thus corresponding to a negative signal amplitude, a blocking pulse is supplied over conductor 96 to the initial digit recorder 97. This recorder is actually a gating circuit to which are supplied the C pulses from the generator 57 (Fig. 5) over conductor 60. The gating circuit is normally open, thus permitting the C pulses from conductor 60 to pass to the output conductor 91. If, however, the sample pulse appears on conductor 90, a blocking pulse is supplied over conductor 96 and prevents the corresponding C pulse from conductor 60 from reaching conductor 91.

The buffer amplifier 95 also supplies the sample pulse as a positive pulse of amplitude $e$ over conducter 98 to the coding circuit 99, whether the sample pulse appears on conductor 89 or on conductor 90.

The coding circuit 99 is a modified form of the coding circuit shown in Fig. 1, and supplies a four-digit cyclic permutation code representing the sample pulse to the binary code converter circuit 101 over conductor 102. The four-digit binary code produced by the converter 101 is supplied to the output conductor 92.

The A and B timing pulses from the generator 57 (Fig. 1) are supplied respectively over conductors 58 and 59 to control elements 99 and 101, and the C timing pulses are supplied over conductor 60 to control element 97. The pulses from generator 56 (Fig. 1) are also supplied over conductor 84 to the binary converter circuit 101.

Figure 7:
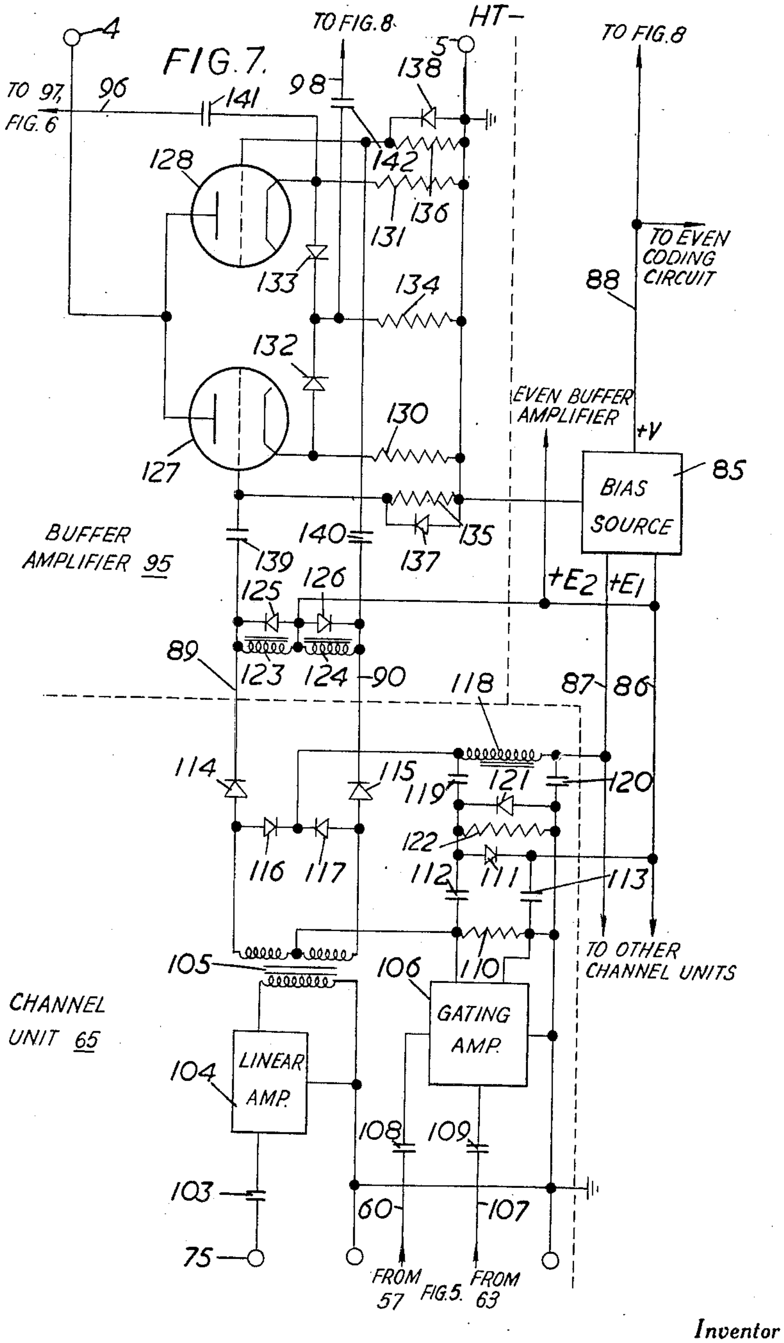
Figs. 7 and 8 show circuit details of certain elements of Figs. 5 and 6.
Figure 8:
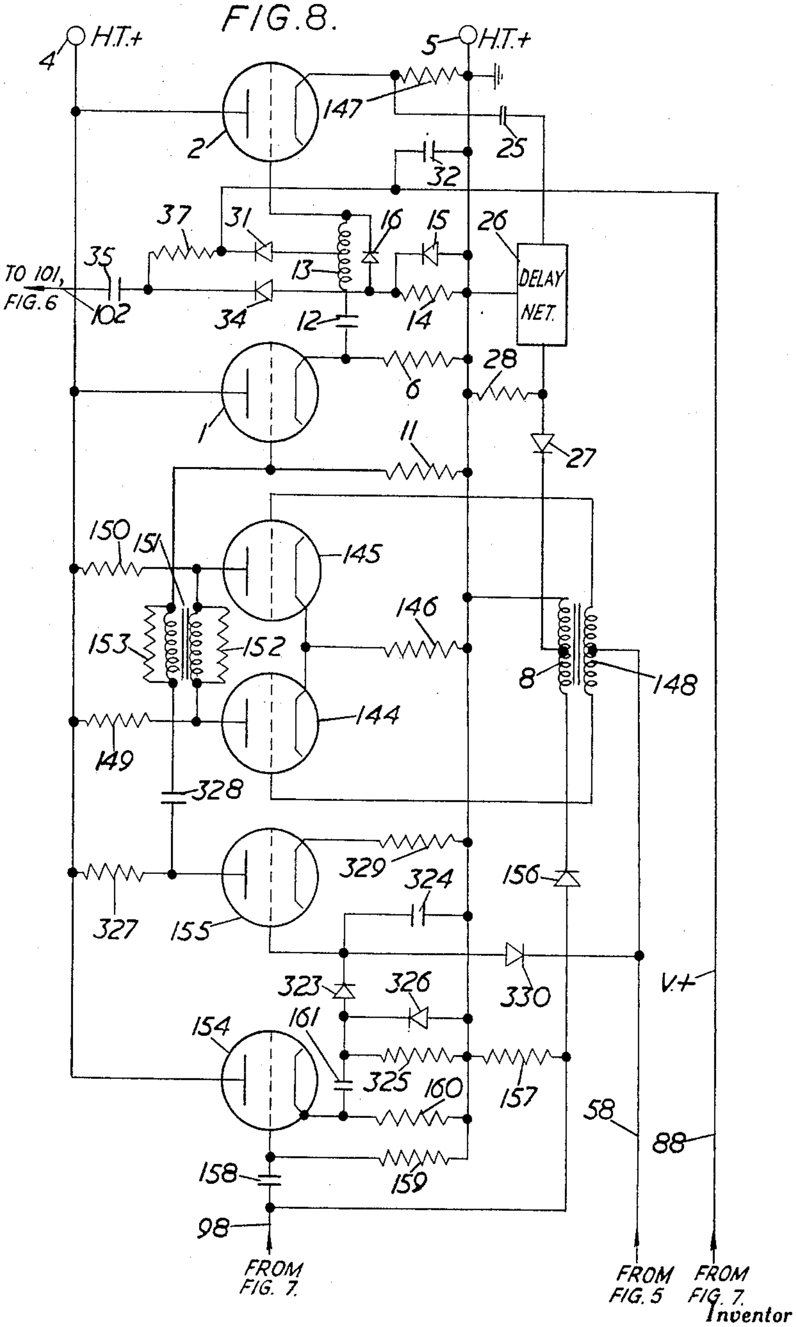

Details of the channel unit 65, buffer amplifier 95, and coding circuit 99 are shown in Figs. 7 and 8. It is not considered necessary to describe in detail the initial digit recorder 97, since this is simply a conventional gating circuit. The binary converter circuit 101 is also a well-known arrangement consisting of a two-condition multivibrator circuit, both conditions of which are stable, the arrangement being such that each code pulse at the output of the coding circuit 99 reverses the condition of the multivibrator circuit. After the code group has been completed, the multivibrator is reset to a given initial condition by the leading edge of one of the A pulses supplied over conductor 59. Pulses at the output of the multivibrator are used to control a gating circuit to which the short pulses from conductor 84 are applied and one of these pulses is allowed to pass only when the multivibrator is in a particular one of its two conditions. In this way, a code group according to the ordinary binary code is produced in response to each cyclic permutation code group.

Fig. 7 shows a detailed circuit diagram of the channel unit 65 (Fig. 5) and the buffer amplifier 95 (Fig. 6). In the channel unit 65, the terminal 75 for the signal wave to be coded is connected through a blocking capacitor 103 to a linear amplifier 104, the output of which is connected to the primary winding of the transformer 105, the secondary winding of which is provided with a centre tap. A gating amplifier 106 is provided, to which are supplied the gating pulses from the delay network 63 (Fig. 1) over conductor 107 and the C timing pulses over conductor 60. Conductors 60 and 107 are connected to the gating amplifier 106 through blocking capacitors 108 and 109. The gating amplifier 106 is a conventional arrangement which produces a positive rectangular gating pulse of duration ½ microsecond across the earthed resistor 110 only when one of the C pulses applied over conductor 60 synchronises with one of the gating pulses applied over conductor 107. A rectifier 111 is connected through blocking capacitors 112 and 113 across the resistor 110. The lower terminal of the rectifier 111 is connected to the bias source 85 over conductor 86. The bias source supplies a fixed bias voltage $+E_1$ to the rectifier 111, which is directed so that it will normally be blocked by this bias voltage. The purpose of this arrangement is to limit rigidly the amplitude of the gating pulse generated by the gating amplifier 106 across the resistor 110 to $E_1$ for a reason which will be explained later. It will be seen that if the gating pulse voltage tends to exceed $E_1$, the rectifier 111 will be unblocked and will prevent any increase of the gating pulse voltage above $E_1$.

The terminals of the secondary winding of the transformer 105 are connected respectively to the output conductors 89 and 90 through rectifiers 114 and 115 directed to pass positive pulses to these conductors. Two further oppositely directed rectifiers 116 and 117 are connected in series across the transformer 105, and the common point of these rectifiers is connected through an inductor 118 to the output conductor 87 of the bias source 85, which supplies a fixed bias voltage $+E_2$ to this conductor. The rectifiers 116 and 117 are directed to be blocked in this condition. The gating pulse which appears across resistor 110 is also supplied across the inductor 118 through blocking capacitors 119 and 120. A rectifier 121 shunted by a ressitor 122 connects the junction point of the capacitors 112 and 119 to ground and is directed to suppress any negative pulses which may be produced by the inductor 118.

The conductors 89 and 90 are also shunted by two equal inductors 123 and 124, connected in series, which are shown as part of the buffer amplifier 95 because they are shared in common by all the channel units of the group, though from their function they really form part of the channel unit circuit. The junction point of the inductors 123 and 124 is connected to the output conductor 86 of the bias source 85, and this junction point is therefore supplied with a bias potential $+E_1$ which is equal to the maximum limited amplitude of the gating pulses from the gating amplifier 106. The inductors 123 and 124 are respectively shunted by two oppositely directed rectifiers 125 and 126 which are directed to suppress any negative pulses which may be generated in these inductors and applied to the conductors 89 and 90.

The channel unit 65 operates in the following manner. It will first be assumed that the signal wave amplitude applied at terminal 75 is zero. Before the appearance of the gating pulse at the output of the amplifier 106, the rectifiers 114 and 115 will be blocked by the bias potential $+E_1$ supplied from conductor 86 through the inductors 123 and 124, and the rectifiers 116 and 117 will be blocked by the bias potential $+E_2$ supplied from conductor 87 through inductor 118. When the gating pulse appears across resistor 110, it will raise the potential of the terminals of the secondary winding of the transformer 105 just to $+E_1$ so that the rectifiers 114 and 115 just fail to be unblocked and no pulse will be supplied to either conductor 89 or 90. At the same time, the gating pulse voltage $+E_1$ is developed across the inductor 118, thus raising the potential applied to the junction point of rectifiers 116 and 117 to $E_1+E_2$. These rectifiers therefore remain blocked.

Now suppose that during the period of the gating pulse the voltage amplitude of the signal wave applied to terminal 75 has some positive value, say $+e_0$. This voltage will be amplified by the linear amplifier 104 and it will be assumed that the transformer 105 is so connected that a positive voltage $+e$ is obtained in consequence at the left terminal of the secondary winding. At the same time an equal negative potential $-e$ will appear at the right terminal of this winding. It follows that the rectifier 114 will now be unblocked and a positive sample pulse of amplitude $+e$ and duration ½ microsecond will be delivered to conductor 89. The negative potential $-e$ appearing at the right terminal of the secondary winding of the transformer 105 will block the rectifier 115, and no pulse will be delivered to conductor 90.

It will be evident that if the amplitude of the signal wave applied to terminal 75 is negative instead of positive, a positive sample pulse of amplitude $+e$ and duration ½ microsecond will be delivered to conductor 90 instead of to conductor 89.

It will be clear that since the bias potential applied to the rectifier 116 and 117 in the presence of the gating pulse at the output of the amplifier 106 is $E_1+E_2$, the rectifier 116 or 117 will be held blocked until the sample pulse amplitude $e$ exceeds $E_2$. The sample pulse amplitude is thus limited to $E_2$, and the bias voltage $E_2$ will therefore be chosen to be equal to the maximum range of amplitude values to be coded.

The buffer amplifier 95 shown in Fig. 7 comprises, in addition to the elements 123 to 126 already mentioned, two similar valves 127 and 128, the anodes of which are directly connected to the positive high tension terminal 4. The cathodes are connected to ground through equal resistors 130 and 131, and also through rectifiers 132 and 133 and a common resistor 134. The control grids are connected to ground through leak resistors 135 and 136 shunted respectively by rectifiers 137 and 138 directed to prevent the potential of the control grids from becoming negative. The conductors 89 and 90 from the channel units are respectively connected to the control grids of the valves 127 and 128 through blocking capacitors 139 and 140.

The output conductor 96 which leads to the initial digit recorder 97 (Fig. 6) is connected through a blocking capacitor 141 to the cathode of valve 128. The ouptut conductor 98 which leads the coding circuit 99 (Fig. 8) is connected to the junction point of rectifiers 132 and 133 through a blocking capacitor 142.

The valves 127 and 128 should be biased to operate as linear cathode follower amplifiers so that there will be delivered to conductor 98 a positive pulse of amplitude substantially equal to $e$ in response to a positive sample pulse of amplitude $e$ applied from any channel unit to either conductor 89 or 90. The rectifiers 132 and 133 are directed to pass positive pulses from the cathodes to the resistor 134, and isolate the cathodes from one another so that when a simple pulse is delivered from the cathode of valve 127, rectifier 133 will be blocked, and vice versa.

It will be noted, however, that a positive output pulse will be delivered to conductor 96 only if the input sample pulse occurs on conductor 90, corresponding to a negative signal amplitude. As already explained, this output pulse is applied to block the initial digit recorder 97 (Fig. 6) so that the initial digit pulse obtained from conductor 60 is suppressed.

All the output pulses from the buffer amplifier 95 have a duration of ½ microsecond, which is determined by the duration of the gating pulse at the output of the gating amplifier 106 in the channel unit 65.

It should be mentioned that the bias source 85 is the same source as that shown in Fig. 5 and supplies bias potentials for all the channel units and both the coders. In Fig. 7, conductor 88 from this bias source provides a fixed positive bias potential for the odd and even coding circuits.

The odd coding circuit 99 of Fig. 6 is shown in detail in Fig. 8. It is basically similar to Fig. 1, and some of the elements are the same and have been given the same designations. The differences are partly due to the different method of applying the amplitude compression.

The valves 1 and 2 and their associated elements are the same as in Fig. 1, but the valve 3 is omitted, and instead a pair of similar valves 144 and 145 sharing in common a cathode load resistor 146 are connected after the delay network 26. The voltage doubling autotransformer winding 8 of Fig. 1 is removed from the cathode circuit of valve 2, and a resistor 147 is connected in its place. The winding 8 is coupled to a centre-tapped secondary winding 148 the ends of which are connected respectively to the control grids of the valves 144 and 145. The rectifier 27 is connected to the centre tap of the winding 8.

The anodes of the valves 144 and 145 are connected to terminal 4 through equal load resistors 149 and 150, and these anodes are connected together through the primary winding of a unity ratio transformer 151, the secondary winding of which is connected to the control grid of the valve 1. The two windings of the transformer 151 are shunted respectively by damping resistors 152 and 150.

The transformer 151 is used for subtracting from the amplitude $+e$ of the ½ microsecond sample pulse derived from the buffer amplifier 95 (Fig. 7) over conductor 98, a voltage R$e$ which is produced by the valves 154 and 155, in a manner to be explained later.

The valves 144 and 145 are normally biased beyond cut-off by the resistor 146, but are rendered operative during odd channel periods by the positive A timing pulses supplied over conductor 58 from the timing generator 57 (Fig. 5). This conductor is connected to the centre tap of the winding 148 coupled to the autotransformer winding 8, and each pulse simultaneously unblocks both the valves by raising the potential of the control grids to a positive value which should be sufficiently greater than the cathode potential to permit the valves to operate thereafter as linear amplifiers. It will be noted that since both anode potentials will be changed by the same amount on the application of a timing pulse, no potential will be generated in the secondary winding of the transformer 151 and so no unwanted signal will be generated when the valves are unblocked.

The autotransformer winding 8 has one terminal connected to ground and the other through a rectifier 156 to conductor 98. A resistor 157 connects the rectifier 156 to ground, and this rectifier is directed so that it will pass the positive sample pulses from conductor 98 to the winding 8. When one of these sample pulses arrives (the valves 144 and 145 having been unblocked by a timing pulse, as already explained) it will operate them in push-pull by means of the secondary winding 148, and a corresponding output pulse will be generated by the secondary winding of transformer 151 which should be poled so that the output pulse is applied in positive sense to the control grid of the valve 1.

The conductor 98 is also connected through a blocking capacitor 158 to the control grid of the cathode follower valve 154, which grid is connected to ground through a leak resistor 159. The anode of the valve 154 is connected directly to terminal 4, and the cathode is connected to ground through a load resistor 160. This cathode is also connected through a blocking capacitor 161 and a rectifier 323 to a storage capacitor 324 having one terminal connected to ground. The rectifier 323 is directed to pass positive pulses to charge the capacitor 324. The junction point elements 161 and 323 are connected to ground through a resistor 325 shunted by a rectifier 326 directed in such manner as to prevent the said junction from becoming positive.

The capacitor 324 is also connected to the control grid of the valve 155, the anode of which is connected to terminal 4 through a load resistor 327 and through a blocking capacitor 328 and the secondary winding of the transformer 151 to the control grid of the valve 1. The cathode of the valve 155 is connected to ground through a resistor 329.

The left terminal of the capacitor 324 is connected to conductor 58 through a rectifier 330.

The circuit operates in the following way. During the even-numbered channel periods when there are no timing pulses applied to conductor 58, this conductor will be substantially at zero potential, and the rectifier 330 should be directed so that in this condition the capacitor 324 cannot become positively charged. When, however, a positive timing pulse arrives over conductor 58 during an odd-numbered channel period, the rectifier 330 will be blocked, and the capacitor 324 becomes charged substantially to the potential of the short ½ microsecond sample pulse which arrives over conductor 98. A corresponding fall in the potential of the anode of the valve 155 occurs. The capacitor 324 will remain charged for the whole period of the timing pulse applied to conductor 58, and will be discharged when the timing pulse disappears. Thus a rectangular negative pulse of duration 2½ microseconds, called a compression pulse, will be generated by the anode of the valve 155, and the voltage gain of this valve should be adjusted by suitable choice of the resistors 327 and 329 so that the amplitude of the compression pulse is $Re$.

The gain of the push-pull amplifier comprising the valves 144 and 145 should be so adjusted that the electromotive force generated in the secondary winding of the transformer 151 in response to a ½ microsecond sample pulse applied over conductor 98 is $e$. Then the potential applied to the control grid of the valve 1 will be $e-Re$. Assuming that the control grid-cathode voltage ratio of the valve 1 is substantially equal to 1, it will be clear from the description of Fig. 1 that a digit pulse corresponding to the first digit will be delivered through the capacitor 35 to the output conductor 102 (which leads to the binary converter 101, Fig. 6), if $e-Re$ is equal to or greater than the fixed bias voltage $+V$ applied to the rectifiers 31 and 34 from the source 85 (Fig. 7) over conductor 88. Expressed otherwise, a digit pulse is produced in the first digit position if $e$ is equal to or greater than $V+Re$, which is the same condition which applied in the case of the Fig. 1 coder.

The autotransformer 13, valve 2, and valve 144 in Fig. 8 now operate to produce the remaining digit pulses of the code substantially in the manner explained with reference to Fig. 1, the voltage doubling being done as before by the autotransformer winding 8, although it is placed in a different part of the coding loop. It will be remembered that the compression pulse derived from the valve 155 has a duration of 2½ microseconds, and maintains the voltage $-Re$ constant during the production of all the digit pulses of the code group.

Just after the generation of the code group the timing pulse applied over conductor 58 disappears, and the valves 144 and 145 become blocked, thereby breaking the coding loop and stopping further action, and the storage capacitor 324 is discharged. During the next succeeding 2½ microsecond period, the coder is inoperative, but the sample pulse corresponding to one of the even numbered channels is coded in like manner by the coder 74 (Fig. 5). During the next following 2½ microsecond period, the next odd-numbered channel is dealt with by the coder 73 of Fig. 8, and so on, alternately.

It will be understood that the arrangement which has been described with reference to Fig. 8 produces exactly the same compression characteristic as that described with reference to Fig. 1.

It was explained above that the initial digit recorder 97 (Fig. 6) generates the initial digit pulse unless it is blocked by a pulse from the buffer amplifier 95. Thus if the sample pulse amplitude is zero, an initial digit pulse will be transmitted, thus indicating a positive sample pulse. The succeeding four-digit code group will however have no pulses in any of the digit positions (see the code diagram, Fig. 2) indicating zero amplitude. Also the code group will indicate zero amplitude until the uncompressed sample pulse amplitude corresponds to the amplitude of the first quantising step (strip E, Fig. 2X), after compression. Thus so long as the initial digit recorder 97 (Fig. 6) is designed so that it will be blocked by a pulse at the cathode of the valve 128 (Fig. 7) whose amplitude is slightly less than the uncompressed amplitude corresponding to the first quantising step, the smallest negative sample pulse amplitude which can be distinguished from zero by the code will be correctly indicated as a negative pulse. By reference to Fig. 3, or to Equation 4 it will be seen that the initial digit recorder 97 should be capable of being blocked by the application of a pulse of amplitude about 1 volt or a little less, in the particular case described.

The reason for ensuring that a pulse shall always be transmitted in the initial digit position when the channel is idle is connected with the timing arrangements at the receiver, which have to be very accurately controlled by the digit pulses, as will be explained later. If no digit pulses are transmitted during a relatively long period, the control will be lost and it will take time to re-establish when transmission of signals over the channel begins again.

It should be pointed out that by the use of the above-described coding scheme, using a four-digit code, it is possible to indicate a zero signal amplitude level, and in addition, 15 positive and 15 negative levels, making a total of 31 levels. It should further be mentioned that since positive and negative signal amplitudes are treated identically as regards compression and coding, no distortion due to asymmetric effects will be introduced. The design of the channel circuits is such that no variable amplitude bias of the sample pulses can be introduced.

Figure 10:
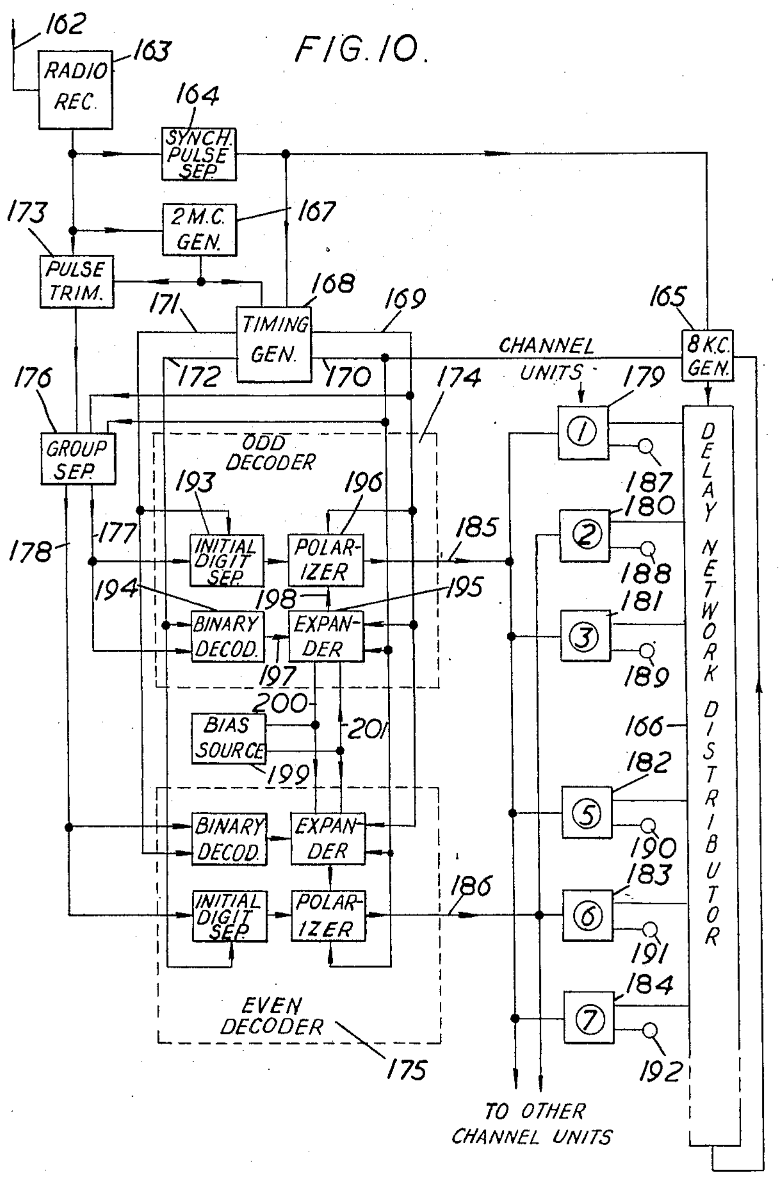
Fig. 10 shows a block schematic circuit diagram of a receiver for the system of Fig. 5.

A receiving terminal for operating with the transmitting terminal shown in Fig. 5 is shown in the block schematic circuit, Fig. 10. Much of this circuit is conventional, but in the succeeding figures, details will be given of those circuits which are chiefly concerned with the decoding and amplitude expansion arrangements. Before describing the circuit, a general account of the method of expansion will be given.

The relation between the original signal wave amplitude

*e* and the quantising step number *n* was given by Equation 3 above as $$e=nV/(2^{(N-1)}-nR) \quad (3)$$

In the receiver of Fig. 10, the initial digit pulse of the code group representing a sample of the signal wave is separated from the remaining digit pulses and is used to determine the sign of the sample which is recovered from the remaining digit pulses by means of a conventional decoder.

A sample pulse is thereby produced whose amplitude is proportional to $n$V. In order to obtain the original amplitude *e*, it is necessary effectively to divide $n$V by the factor $2^{(N-1)}-n$R, according to Equation 3, for each value of *n*. One way of doing this is to generate a pulse of constant amplitude having a duration proportional to *e*, the duration of this pulse being determined by the time necessary for charging a capacitor to a potential proportional to $n$V at a constant rate proportional to $2^{(N-1)}-n$R. The potential from which the capacitor is charged is obtained from the decoded sample pulse in a manner similar to that described with reference to Figs. 7 and 8 for producing the potential $e-\mathrm{R}e$. This method of expanding the sample pulse amplitude does not depend on the use of any element with a non-linear characteristic.

In Fig. 10, the pulse modulated waves are received from the transmitter (Fig. 5) on an antenna 162, connected to a radio receiver 163 by which the groups of digit pulses and the synchronising pulses are recovered by conventional means from the incoming waves, and are suitably amplified and limited to remove the effects of noise and interference as far as possible. The synchronising pulses are isolated by a conventional synchronising pulse separator 164 and are used to control a gating pulse generator 165 which supplies gating pulses repeated at 8 kilocycles per second to the delay network distributor 166 used for controlling the respective channel units.

Although the code pulses are limited in amplitude in the radio receiver 163, their leading and trailing edges will be affected by noise, and it is necessary that they should be trimmed. For this purpose a generator 167 controlled by the incoming pulses is provided to produce a train of trimming pulses of duration ¼ microsecond and repeated at a frequency of 2 megacycles per second.

The digit pulses at the output of the radio receiver 163 will always occur at intervals spaced by integral multiples of ½ microsecond, and as already explained, even when all channels are idle the initial digit pulse of each channel is transmitted, and these pulses are spaced apart by intervals of 2½ microseconds. The generator 167 therefore comprises one or more resonant circuits very sharply tuned to 2 megacycles per second, and these resonant circuits are caused to "ring" by the incoming digit pulses so that there is generated a sinewave of frequency 2 megacycles per second which will be substantially free from noise. A train of positive trimming pulses of ¼ microsecond duration with a repetition frequency of 2 megacycles per second is derived from the sinewave by conventional means.

Figure 9:
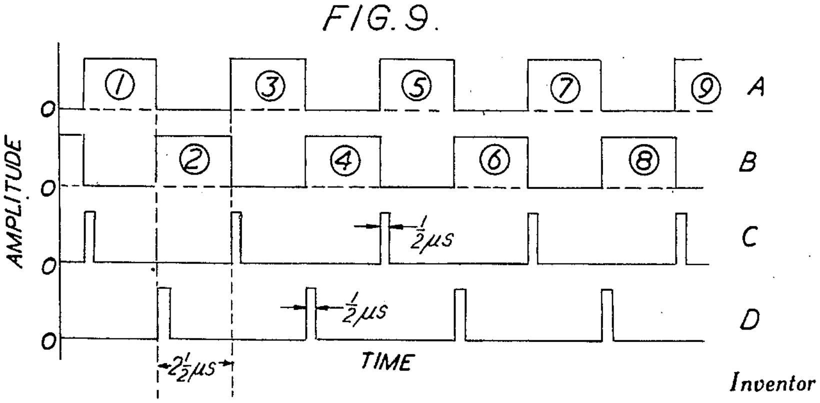
Fig. 9 shows graphical diagrams illustrating timing pulses used in the transmitter of Fig. 5.

The trimming pulses from the generator 167 are applied to a timing wave generator 168 which by frequency division produces four series of 200 kilocycles timing pulses similar to those produced by the generator 57 of Fig. 5, and illustrated in Fig. 9, except that the C and D pulses have a duration of ¼ microsecond instead of ½ microsecond. These four series of timing pulses are supplied respectively to conductors 169 to 172.

The synchronising pulses from the output of the separator 164 are supplied to the timing pulse generator 168 to determine the phasing of the four series of timing pulses.

The digit pulses at the output of the radio receiver 163 are applied to a pulse trimming circuit 173 to which are also supplied the trimming pulses from the generator 167. The circuit 173 is a conventional gating circuit; and the digit pulses are used effectively as gating pulses which permit the passage of corresponding trimming pulses. Thus effectively each digit pulse which is present is replaced by a trimming pulse which is substantially free from noise.

The groups of digit pulses are decoded alternately by two similar decoders 174 and 175 corresponding respectively to the odd and even numbered channels. A group separator 176 directs the digit pulse groups alternately to the decoders 174 and 175 over conductors 177 and 178. The group separator 176 comprises two normally blocked gating circuits to which the digit pulses from the pulse trimmer 173 are applied, the outputs of the gating circuits being connected respectively to conductors 177 and 178. The gating circuits are unblocked alternately by the A and B timing pulses from conductors 169 and 170 which are connected to the group separator 176.

Six channel units 179 to 184 are shown, corresponding to channels 1, 2, 3 and 5, 6, 7. Since channel 4 is used as the synchronising channel, no channel unit for channel 4 is required in Fig. 10. The output of the odd decoder 174 is connected over conductor 185 to the odd-numbered channel units 179, 181, 182 and 184, while the output of the even decoder 175 is connected over conductor 186 to the even-numbered channel units 180 and 183. Gating pulses of duration about 3 microseconds are supplied from corresponding tapping points on the delay network 166 to the channel units to render them operative in turn at the proper times. The recovered signal waves corresponding to the various channels are obtained from the output terminals 187 to 192.

It will be understood that although only six channel units are shown in Fig. 10 as many as may be necessary will be supplied, and will be connected alternately to conductors 185 and 186.

The odd and even decoders 174 and 175 are made up of identical elements, and in the case of the decoder 174 these elements consist of an initial digit separator 193 controlled by the A timing pulses from conductor 169; a conventional binary decoder circuit 194 controlled by the D timing pulses from conductor 172; an amplitude expander 195 controlled by the A and B timing pulses from conductor 170; and a polarizer circuit 196 controlled by the A timing pulses from conductor 169. The initial digit separator 193 selects the initial digit pulse (if present) and supplies it to control the polarizer 196 in order to determine the sign of the recovered sample pulse. The decoding circuit 194 produces from the remaining four digit pulses of the code group an output pulse whose amplitude is proportional to the compressed amplitude of the corresponding signal wave sample at the transmitter. This output pulse is applied over conductor to the expander 195, and as already explained the expander produces an output pulse of constant amplitude, but having a duration proportional to the uncompressed sample amplitude. This duration modulated output pulse is supplied over conductor 198 to the polarizer 196, and will be inverted by the polarizer if the initial digit pulse from the separator 193 is absent, but not otherwise. The duration modulated output pulse is then added to a pulse of constant amplitude and duration and delivered over conductor 185 to the odd numbered channel units. The expander 195 is supplied with two different fixed potentials from a stabilised bias source 199 over conductors 200 and 201. The even decoder 175 is exactly the same as the odd decoder, but the A and B timing pulses used to control it are interchanged, and the C pulses are used instead of the D pulses.

Circuit details of the initial digit separator 193, the expander 195 and the polarizer 196, and of one of the channel units 179 are shown in the succeeding figures. The remaining elements of Fig. 10 are conventional and do not need detailed description.

The binary decoding circuit 194 is of a well known type in which the digit pulses are stored in a delay line in such manner that those digit pulses which are present simultaneously unblock corresponding digit valves to which are applied the D pulses which have a duration of ¼ microsecond. The digit valves produce output voltages proportional to the series 2, 4, 8, 16 etc. and their outputs are added together, so that a decoded output pulse of duration ¼ microsecond is produced, the amplitude of which corresponds to the code combination. The delay network is so arranged that the initial digit pulse is lost and does not affect the amplitude of the decoded output pulse, which is determined only by the four remaining digit pulses of the group. It will be noted that the decoded output pulse occurs at the beginning of the even-numbered channel period which follows the odd numbered period occupied by the code group of pulses, and the final amplitude expansion takes place during this even-numbered period.

The amplitude of the decoded output pulse from the decoding circuit 194 will be proportional to $n$V, which is the amplitude of the corresponding sample pulse at the transmitter (Fig. 5) after compression. For clearness, it will be assumed that the amplitude of the decoded output pulse has been made equal to $n$V, though this is, of course, not essential.

Figure 11:
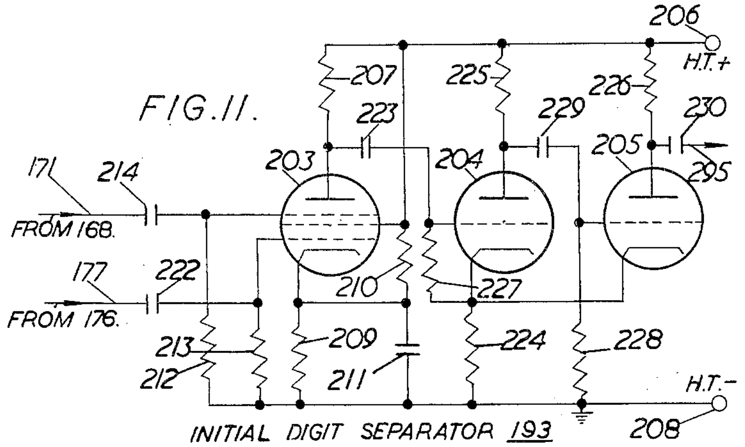
Figs. 11, 12 and 13 show circuit details of certain elements of Fig. 10.
Figure 13:
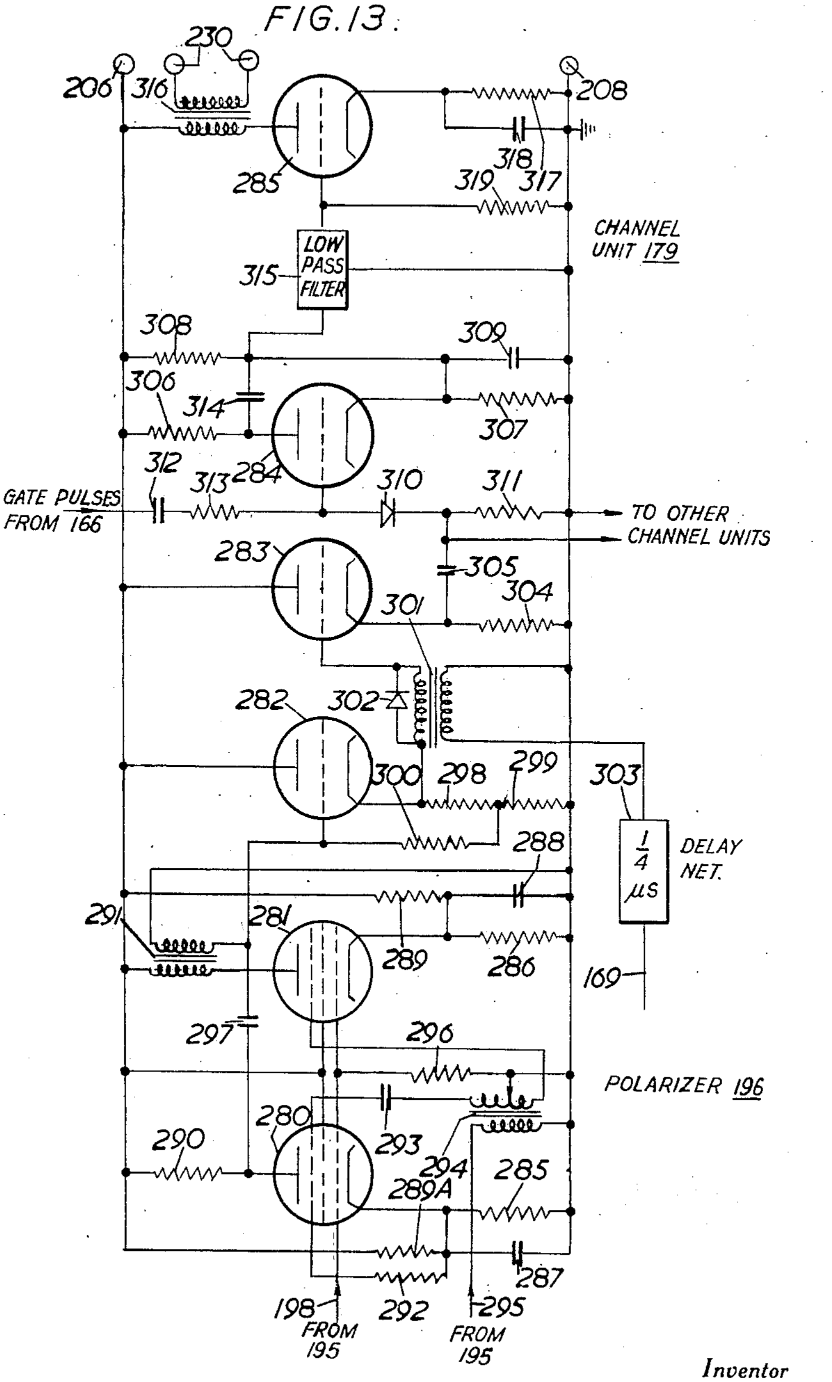

The initial digit separator shown in Fig. 11 consists of two parts. The first part, comprising a valve 203, is effectively a gating arrangement which allows the initial digit pulse to pass, but blocks the remaining digit pulses. The other part of the circuit consists of the valves 204 and 205, which form a single-stable multivibrator, which is triggered by the selected initial digit pulse, and generates a pulse of duration slightly over 5 microseconds, which is supplied over conductor 169 to the polariser 196 (Fig. 13).

The valve 203 is pentode valve, the anode of which is connected to the positive terminal 206 for the high tension source (not shown) through a load resistor 207. The cathode is connected to the grounded negative high tension terminal 208 through resistor 209. The screen grid of the valve 203 is connected directly to terminal 206, and to the cathode through a resistor 210. The resistor 209 is shunted up a by-pass capacitor 211. The suppressor grid is connected to ground through leak resistor 212. The control grid of the valve 203 is connected to ground through a leak resistor 213. The resistors 207 and 209 should be chosen so that the valve 203 is normally blocked by both the control grid and the suppressor grid.

The C timing pulses are applied over conductor 171 and through a capacitor 214 to the suppressor grid of the valve 203, and the digit pulses from the group separator 176 (Fig. 10) are supplied over conductor 177 through a blocking capacitor to its control grid.

When one of the positive C timing pulses arrives, it unblocks the valve 203 on the suppressor grid and thus allows only the initial digit pulse to pass through, the valve being afterwards blocked again to the remaining pulses of the group.

The initial digit pulse is supplied as a negative pulse through the blocking capacitor 223 to the control grid of the valve 204. The cathode of this valve is connected to the cathode of the valve 205 and also to ground through a resistor 224. The anodes of the valves 204 and 205 are respectively connected to terminal 206 through resistors 225 and 226. The control grid of the valve 204 is connected to the cathode through a leak resistor 227, and the control grid of the valve 205 is connected to ground through a leak resistor 228, and to the anode of the valve 204 through a blocking capacitor 229. The output conductor which leads to the polariser 196 (Fig. 13) is connected to the anode of the valve 205 through a blocking capacitor 230.

The valves 204 and 205 form a multivibrator the initial condition of which is such that the valve 204 is passing current, while the valve 205 is cut off. When the negative initial digit pulse is applied to the valve 204, it cuts this valve off and renders the valve 205 conducting. After a certain time determined by the time constant of the multivibrator circuit, the multivibrator reverts to its initial condition, and the anode of the valve 205 thus generates a negative rectangular pulse which is supplied to the polarizer 196. The time constant of the circuit should be chosen so that the duration of this pulse is slightly greater than 5 microseconds. This duration is not critical, but it should not exceed about 7 microseconds. Thus it will be seen that in response to the selected initial digit pulse, there is produced a negative rectangular pulse of duration slightly over 5 microseconds, which is supplied to the polariser.

Figure 12:
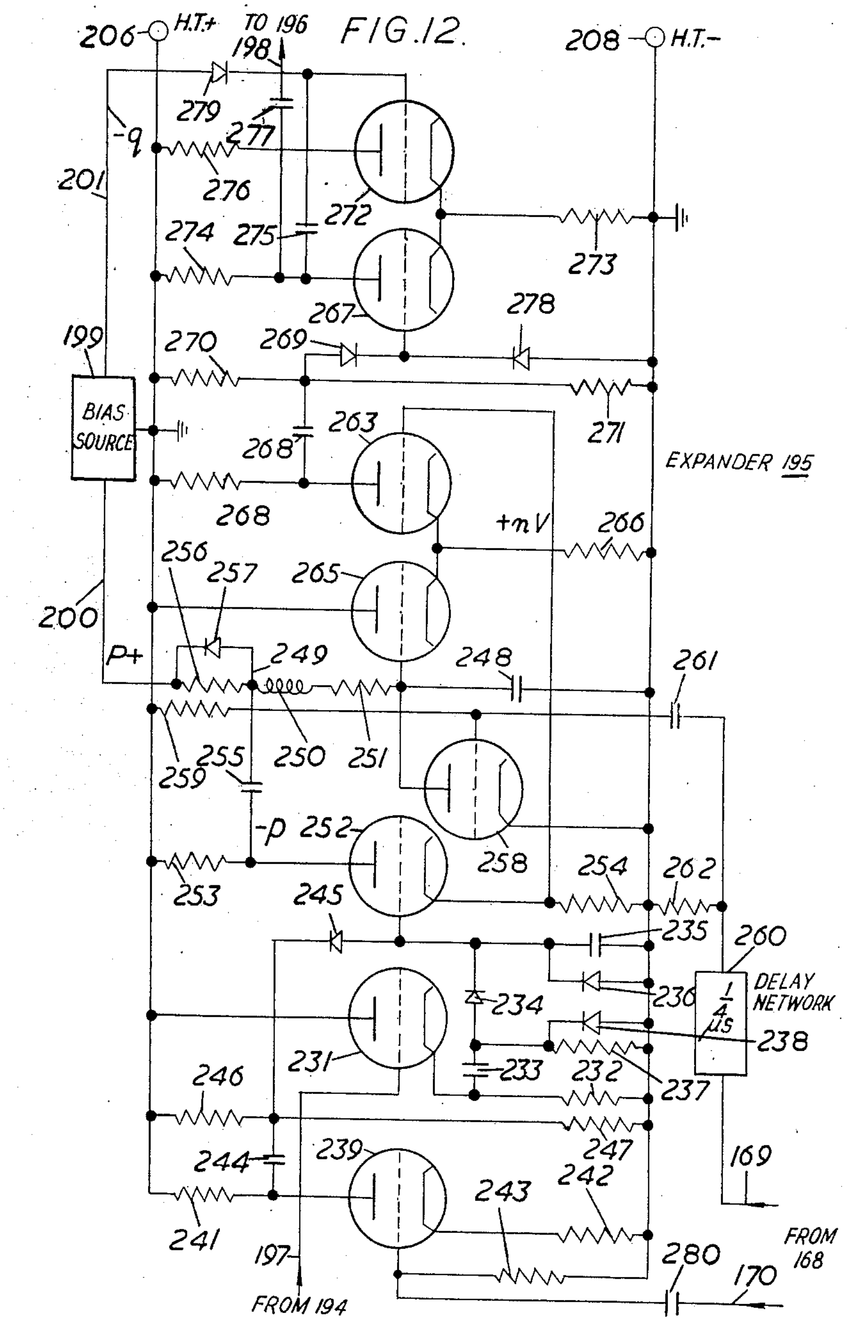

Details of the expander 195 (Fig. 10) are shown in Fig. 12. The decoded output pulse from the binary decoding circuit 194 (Fig. 10) has a duration of ¼ of a microsecond, and is applied to the control grid of the valve 231 over conductor 197. The anode of this valve is connected directly to the positive high tension terminal 206, and the cathode is connected to ground through a resistor 232. This cathode is also connected through a blocking capacitor 233, and a rectifier 234, to a storage capacitor 235, one terminal of which is connected to ground. The valve 231 should be biased to operate on the linear portion of the characteristic. When the decoded pulse arrives over conductor 197, it charges the capacitor 235 substantially to a potential equal to its amplitude, and on the disappearance of the pulse, the rectifier 234 will be blocked, and the charge will be held in the capacitor 235. This capacitor is shunted by a rectifier 236 directed to prevent the capacitor from acquiring a negative charge. The junction point of elements 233 and 234 is connected to ground through a resistor 237, shunted by rectifier 238, directed in the same manner as the rectifier 236.

Just before the arrival of the pulse over conductor 197, the capacitor 235 is completely discharged by one of the B timing pulses which arrives over conductor 170, and is supplied to the control grid of a discharging valve 239 through a blocking capacitor 280. The anode of the valve 239 is connected to terminal 206 through a load resistor 241, and the cathode is connected to ground through a resistor 242. The control grid is connected to ground through a leak resistor 243. The anode of the valve 239 is connected to the upper terminal of the storage capacitor 235 through a blocking capacitor 244 and a rectifier 245. The junction point of elements 244 and 245 is connected to terminals 206 and 208 through resistors 246 and 247, respectively. The rectifier 245 will have a positive potential applied to its upper terminal, and it should be directed so that it will normally be blocked. The values of the resistors 246 and 247 should be chosen so that the rectifier 245 is just held in the blocked condition when the positive potential of the storage capacitor 235 has the value corresponding to a decoded pulse of maximum amplitude. The leading edge of the one of the B timing pulses occurs just before the decoded pulse arrives over conductor 197, and accordingly a very short positive pulse is applied through capacitor 280 to the control grid of the valve 239. A corresponding short negative pulse is generated at the anode of this valve and unblocks the rectifier 245, thereby discharging the capacitor 235. The immediately following decoded pulse recharges the capacitor 235 substantially the voltage $n$V corresponding to its amplitude, as already explained.

The expansion of the amplitude of the decoded pulse is carried out by applying to the capacitor 248 a potential equal to the difference between a fixed positive potential P which is supplied by the bias source 199 over conductor 200, and a positive potential $p$, which is proportional to the potential acquired by the storage capacitor 235. The charging potential $P-p$ is produced at the point 249 which is connected to the capacitor 248 through an inductor 250 and a resistor 251.

By suitable choice of the values of the elements 248, 250 and 251 it may be arranged so that the rate of charging the capacitor 248 is substantially proportional to $P-p$ over a period of at least 2½ microseconds. The method of choice of these values will be explained more fully later.

The potential $-p$ proportional to the potential acquired by the capacitor 235, but of opposite sign, is applied to the point 249 by a valve 252, the control grid of which is connected to the junction point of the elements 235 and 245. The anode of the valve 252 is connected to terminal 206 through a resistor 253, and the cathode is connected to ground through a resistor 254, which should be chosen to bias the valve to the linear part of its characteristic. The anode of the valve 252 is connected to point 249 through a blocking capacitor 255.

The fixed potential $+P$ is supplied to point 249 from the bias source 199 over a resistor 256 shunted by a rectifier 257 which is directed so that it will prevent the potential of the point 249 from exceeding $+P$.

The capacitor 248 is shunted by the anode-cathode circuit of a valve 258. The control grid of this valve is connected to terminal 206 through the resistor 259. The A timing pulses are applied over conductor 169, through a delay network 260, and a blocking capacitor 261 to the control grid of valve 258. The delay network 260 should introduce a delay of ¼ microsecond, and is provided with a terminating resistor 262. During the odd-numbered channel period occupied by the digit pulses which have just been decoded, a positive potential is applied to the control grid of the valve 258 by the corresponding timing pulse. The arrangement should be such that when the timing pulse disappears at the beginning of the following even-numbered channel period, the valve 258 is cut off. It will be seen therefore, that during the odd-numbered period, the capacitor 248 is held discharged by the valve 258, but that at the beginning of the even numbered period, the valve is blocked and therefore permits the capacitor 248 to be charged.

The cathode of the valve 252 is connected to the control grid of a valve 263, the anode of which is connected to terminal 206 through a load resistor 264. A similar valve 265 has its control grid connected to the junction point of elements 248 and 251 and its anode connected directly to terminal 206. The two cathodes are connected through a common resistor 266 to ground.

The anode of the valve 263 is connected to the control grid of a valve 267 through a blocking capacitor 268 and a rectifier 269. This rectifier is directed so that it will normally pass positive pulses to the control grid of the valve 267. The left terminal of the rectifier 269 is provided with a positive bias by means of two resistors 270 and 271 connected in series between terminals 206 and 208.

The valve 267 forms with another similar valve 272 a multivibrator circuit. The cathodes of the valves 267 and 272 are connected through a common resistor 273 to the ground. The anode of the valve 267 is connected to terminal 206 through a resistor 274 and to the control grid of the valve 272 through a capacitor 275. The anode of the valve 272 is connected to terminal 206 through a resistor 276. The output conductor 198 is connected through a blocking capacitor 277 to the anode of the valve 267.

When the decoded pulse from the decoding circuit 194 arrives over conductor 197 and charges capacitor 235, as already explained, a potential substantially equal to $nV$ appears across resistor 254, and is applied to the control grid of the valve 263. This potential is positive and appears as a negative pulse at the anode of the valve 263. The rectifier 269 should be biased by the resistors 270 and 271 so that the upper terminal is slightly positive to the lower terminal, so that it will be just unblocked. The negative pulse at the anode 263 will first pass through the rectifier 269 to the control grid of the valve 267 (which will initially be in the conducting condition) but this pulse will quickly block the rectifier 269. In the meanwhile, a negative pulse sufficient to block the valve 267 will have been applied to the control grid, and the multivibrator will be switched to the opposite condition. As already explained above, in the meanwhile the capacitor 248 has begun to charge from the potential $P-p$ at the point 249. The potential of the control grid of the valve 265 starts to rise, and the potential of the two cathodes will follow it until this potential reaches the value $nV$, when a positive pulse is delivered from the anode of the valve 263 to the control grid of the valve 267, thereby switching the multivibrator back to the original condition. It will be evident therefore, that the anode of the valve 267 will generate a positive rectangular pulse, the duration of which is substantially equal to the time taken by the potential of the capacitor 248 to rise to the value $nV$. This pulse is delivered to the polarizer over conductor 198.

The control grid of the valve 267 is connected to ground through a rectifier 278 directed to prevent this control grid from becoming negative with respect to ground. The control grid of the valve 272 is connected through a rectifier 279 to the conductor 201 from the bias source 199. This conductor provides a small negative bias potential $q$ and it will be seen therefore, that the control grid of the valve 272 cannot fall below the potential $-q$. The provision of the rectifiers 278 and 279 is for the purpose of limiting the potential variation of the control grids to enable the multivibrator to settle down as quickly as possible after each operation.

The delay network 260 is provided chiefly in order to allow time for the multivibrator to be switched over on application of the potential $nV$ to the control grid of the valve 263. Another reason for providing the delay is to allow time for the disappearance of any disturbances produced by the inductor 250 on application of the potential $p$.

The considerations which govern the choice of the values of the elements 248, 250 and 251, can be derived from the analysis of a capactior charging circuit including inductance, such as that given in paragraph 7.6 on page 261 of the textbook "Waveforms" of the Massachusetts Institute of Technology Radiation Laboratory Series No. 19, 1949, published by the McGraw-Hill Book Company. The requirement is that the ratio of the potential across the capacitor 248 to the applied potential $P-p$ shall increase substantially linearly with time over a period of a least 2½ microseconds. If C, L and R are the capacitance, inductance and resistance of elements 248, 250 and 251 respectively, and $m=L/CR^2$, these values should be selected so that the potential of the capacitor 248 reaches the value of $nV$ corresponding to the maximum amplitude of the decoded pulse applied over conductor 197 in about 2¼ microseconds, while $m$ is chosen sufficiently large to ensure that the time-increase of potential of the capacitor 248 is always substantially linear.

The rate of rise of the potential of the capacitor 248 can be expressed as $r(P-p)$ volts per microsecond, where $r$ is a constant depending on the values of the elements 248, 250 and 251. The time $t$ taken for the potential of the capacitor 248 to rise to the value $nV$ will thus be $$t=nV/r(P-p) \qquad (4)$$

The time $t$ is also the duration of the positive pulse generated by the valve 267 and supplied to the polariser over conductor 198. In order to provide the proper amount of expansion, it is necessary that $t$ should be proportional to $e$, which is the original amplitude of the sample pulse before compression at the transmitter. From Equation 3 above, the value of $e$ is given as $$e=nV/(2^{(N-1)}-nR) \quad (3)$$

If $t$ be put equal to $e/k$ where $k$ is a constant, we have $$t=nV/k(2^{(N-1)}-nR) \quad (5)$$

Equations 4 and 5 will be identical if $P=2^{(N-1)}.k/r$ (which is constant), and $p=nRk/r$, which is proportional to $n$ and therefore to $n$V, so that $p$ can be derived from $n$V suitably choosing the gain of the valve 252. The ratio $k/r$ should preferably be chosen so that for the maximum value of $n$V, the corresponding value of $t$ is about equal to the time occupied by the digits of the code group (for example, about 2¼ microseconds).

In the particular system described with reference to Figs. 5 and 10 in which $N=4$, the channel period being 2½ microseconds, and in which the compression at the transmitter is given by Fig. 3, suitable values for P and $p$ are 20V volts and $n$V volts. In other words the gain ratio of the valve 252 will be equal to 1 between the control grid and anode, as well as between the control grid and cathode.

Fig. 13 shows details of the polariser 196 and of the channel unit 179 shown in Fig. 10. The polariser comprises the circuit associated with the valves 280, 281, 282 and 283, and the channel unit comprises the valves 284, and 285. Valves 280 and 281 are two similar pentode valves the cathodes of which are connected to ground through resistors 285 and 286 shunted by capacitors 287 and 288, and to terminal 206 through resistors 289 and 289A. The four resistors are provided for suitably biasing the cathodes. Both the screen grids are connected directly to terminal 206. The anode of the valve 280 is connected through a load resistor 290 to terminal 206, and the anode of the valve 281 is connected to terminal 206 through the primary winding of a transformer 291. The suppressor grid of the valve 280 is connected to the cathode through a leak resistor 292 and through a capacitor 293 to one end of the secondary winding of a transformer 294. The other end of this winding is connected directly to the suppressor grid of the valve 281, and the centre point of this secondary winding is connected directly to ground. The primary winding of the transformer 294 has one end connected to ground, and the other end connected to a conductor 295 which leads from the output of the initial digit separator 193 (Fig. 10). The control grids of the valves 280 and 281 are connected together, and to the conductor 198 from the expander 195 (Fig. 10). These two control grids are also connected to ground through a leak resistor 296. The anode of the valve 280 is connected to the control grid of the valve 282 through a blocking capacitor 297. The secondary winding of the transformer 291 has one end connected to ground, and the other end connected to the control grid of the valve 282.

The valves 280 and 281 should be biased so that they are cut off by the control grids. It will be noted that the valve 281 will also be cut off at the suppressor grid, but not the valve 280. The positive pulse from the expander (Fig. 12), is applied over conductor 198 to the control grids of the two valves 280 and 281. The valve 280, being unblocked, a corresponding negative pulse will be generated at the anode, and will be applied to the control grid of the valve 282. If, however, a control pulse arrives over conductor 295 from the initial digit separator 193 over conductor 295, the valve 280 will be cut off at the suppressor grid, and the valve 281 will be opened, provided that the transformer 294 is suitably connected. As stated above, the control pulse will have a duration of at least 5 microseconds. The output pulse now comes from the anode of the valve 281, and provided that the transformer 291 is suitably connected, this pulse will be applied as a negative pulse to the control grid of the valve 282. Thus it will be seen that the output pulse applied to the valve 282 will be negative if an initial digit pulse is present, and will be positive otherwise. Conventional limiting arrangements (not shown) may be applied to the control grid of the valve 282 to equalise the amplitudes of the positive and negative pulses.

The anode of the valve 282 is connected directly to terminal 206, and the cathode is connected to ground through two resistors 298 and 299 connected in series. The control grid is connected to the junction point of these resistors through a leak resistor 300. The cathode of the valve 282 is connected through a secondary winding of a transformer 301 to the control grid of a valve 283, and this secondary winding is shunted by rectifier 302. The primary winding of the transformer 301 has one terminal connected to ground, and the other terminal connected through a delay network 303 to the input of which is connected to conductor 169 over which are applied the A timing pulses. The anode of the valve 283 is connected directly to terminal 206, and the cathode is connected to ground through a resistor 304. It will be seen that the leading edge of one of the pulses applied over conductor 169 will substantially coincide with the leading edge of the output pulse applied to the control grid of the valve 282, after the delay of ¼ microsecond in the delay network 303. The potential applied to the control grid of the valve 283 will be the sum of the potential across the secondary winding of the transformer 301 and the potential of the cathode of the valve 282. It should be arranged so that the amplitude of the pulses which appear across the secondary winding of the transformer 301 is greater than the amplitude of the output pulses appearing at the cathode of the valve 282. If it be assumed that the transformer 301 is so connected that the cathode of the valve 282 is negative to the control grid of the valve 283 when a pulse appears on conductor 169, the amplitude of the pulse applied to the control grid of the valve 283 will be equal to the sum of the amplitudes of the output pulses and of the timing pulse when an initial digit pulse is absent, and will be equal to the difference of the amplitudes of the pulses when the initial digit pulse is present. The rectifier 302 is provided to prevent the cathode of the valve 282 from becoming positive to the control grid of the valve 283.

The cathode of the valve 283 is connected to the channel unit through a blocking capacitor 305. The valve 284 of the channel unit is a gating valve, and its anode is connected to terminal 206 through a load resistor 306, and its cathode is connected to ground through a resistor 307, and to terminal 206 through a resistor 308. The resistor 307 is shunted by a capacitor 309.

The resistors 307 and 308 should be chosen so that the valve 284 is normally cut off. The capacitor 305 is connected to the control grid of the valve 284 through a rectifier 310 and to ground through a resistor 311. The gating pulses from the corresponding tapping point of the distributor 166 (Fig. 10), are supplied as positive pulses to the control grid of the valve 284 through a capacitor 312 and a resistor 313. These gating pulses cannot unblock the valve 284 unless there is a positive potential at the lower terminal of the rectifier 310. Thus the valve becomes unblocked when a pulse from the cathode of the valve 283 synchronises with gating pulse applied through the elements 312 and 313. When this occurs the corresponding negative pulse is delivered from the anode of the valve 284 through the blocking capacitor 314 and a low pass filter 315 to the control grid of the signal frequency amplifying valve 285. This valve is arranged as an ordinary linear amplifier, and its anode is connected to terminal 206 through the primary winding of an output transformer 316. The cathode is connected to ground through a bias resistor 317 shunted by a capacitor 318, and the control grid is provided with a leak resistor 319. The secondary winding of the output transformer 316 is connected to a pair of output terminals 320.

Figure 14:
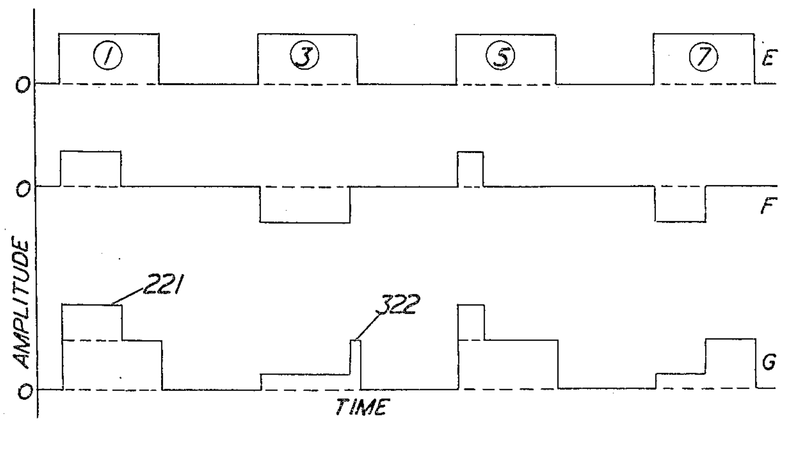
Fig. 14 shows graphical diagrams used to explain the operation of Fig. 13.

The reason for adding the pulses of constant duration to the positive or negative duration modulated pulses applied to the valve 282 will be explained with reference to the graphs of Fig. 14. Graph E shows some of the positive pulses of constant amplitude and duration applied to the control grid of the valve 283 by transformer 301. Graph F shows four examples of duration modulated pulses applied to the valve 282, and corresponding to different odd numbered channels. As already explained, these pulses have constant amplitude less than the amplitude of the pulses of graph F, but the duration of each is proportional to the amplitude $e$ of the corresponding signal wave sample. Two of the pulses are positive, and two are negative. Graph G shows the composite pulses obtained by adding together the pulses of graphs E and F. It will be noted that the composite pulses of graph G are in stepped form, but the amplitude is never negative. Each of these pulses will of course be dealt with by a different channel unit, but if it be assumed that the composite pulse 321 corresponds to channel 1, for example, the filter 315 will integrate a series of channel 1 composite pulses like 321 and will produce an output current having a first constant positive portion I derived from the lower portions of the pulses like 321, and a second variable positive portion $i$ derived from the upper portions of the pulses like 321. The total current is thus $I+i$. If however the channel 3 pulse 322 corresponds to a negative sample of the signal wave, it will be seen that the output current obtained by the filter 315 of the corresponding channel unit will be $I-i$. The transformer 316 will cut off the constant component I and will pass the variable component $i$ which will have either sign according to the sign of the amplitude of the corresponding signal wave.

Since all the composite pulses of graph G have positive portions, the necessary unblocking of the valve 284 will be properly accomplished and these pulses will be passed through the valve 284 to the filter 315.

While the principles of the invention have been described above in connection with specific embodiments, and particular modifications thereof, it is to be clearly understood that this description is made only by way of example and not as a limitation on the scope of the invention.

What I claim is:

1. A coding circuit for electric pulse code modulation comprising translator means to translate a sample pulse into a group of time spaced digit pulses representing the amplitude of said sample pulse, means for deriving a potential dependent upon the amplitude of said sample, and of a duration effectively corresponding to the time duration of said digit group, and means responsive to said derived potential to control said translator means during its operation to effect a compression of the amplitude of said sample.

2. A coding circuit according to claim 1 wherein said translator means comprises means providing a comparison voltage level, and means for comparing said sample with said voltage level to derive said digit pulses, and said means for deriving a potential further comprises means for applying said derived potential to adjust said comparison voltage level.

3. A coding circuit according to claim 2, wherein said means for deriving a potential comprises means for producing a voltage pulse dependent upon said sample amplitude, a potentiometer across which said voltage is applied, and an adjustable tap on said potentiometer, and said means for applying said derived voltage comprises a circuit for subtracting the voltage at said tap from said comparison voltage.

4. A coding circuit according to claim 1, wherein said translator means comprises means providing a comparison voltage level, and means for comparing said sample with said voltage level to derive said digit pulses and said last named means comprises means for applying said derived potential to adjust the amplitude of said sample.

5. A coding circuit according to claim 1, wherein said last named means comprises circuit elements with linear characteristics.

6. A pulse coder for electrical pulses representing a signal wave comprising a multi-stage amplifier the first stage having substantially a one-to-one amplification ratio, and another stage having substantially a two-to-one amplification ratio, means normally biasing said first stage to respond to a value equal to half the maximum amplitude of an input sample pulse, delay means in the output of said amplifier, means coupling the output of said delay means to said first amplifier stage whereby separate digit code pulses may be derived from said first stage, means for applying a sample pulse to the input of said first stage, and means for reducing said normal bias under control of said applied sample pulse to effect a volume compression of said signal wave amplitude.

7. A pulse coder according to claim 6, wherein said last named means comprises a potentiometer, means for applying a voltage proportional to said applied sample pulse across said potentiometer, and means for applying a voltage drop from said potentiometer inversely to said bias source.

8. A pulse coder according to claim 6, wherein said last named means comprises storage means for storing a potential proportional to said applied sample pulse, means to produce a negative potential in response to said stored potential, and means for applying said negative potential to said first amplifier stage simultaneously with said pulses.

References Cited in the file of this patent

UNITED STATES PATENTS

| | | |
|---|---|---|
| 2,546,316 | Peterson | Mar. 27, 1951 |
| 2,586,825 | Jacobsen | Feb. 26, 1952 |
| 2,607,035 | Levine | Aug. 12, 1952 |
| 2,617,879 | Sziklai | Nov. 11, 1952 |
| 2,636,081 | Feldman | Apr. 21, 1953 |
| 2,650,299 | Peterson | Aug. 25, 1953 |
| 2,662,118 | Schouten et al. | Dec. 8, 1953 |
| 2,724,740 | Cutler | Nov. 22, 1955 |
| 2,807,715 | Lesti | Sept. 24, 1957 |
| 2,836,658 | Weintraub | May 27, 1958 |
| 2,852,607 | Treadwell | Sept. 16, 1958 |
| 2,852,610 | Levine | Sept. 16, 1958 |